United States Patent [19]

Fuller

[11] Patent Number: 4,819,739

[45] Date of Patent: Apr. 11, 1989

[54] FLUID ACTUATED ROCK DRILL HAMMER

[75] Inventor: Dennis D. Fuller, Duncanville, Tex.

[73] Assignee: Dresser Industries, Inc., Dallas, Tex.

[21] Appl. No.: 646,740

[22] Filed: Aug. 31, 1984

[51] Int. Cl.[4] .............................................. B23Q 5/00
[52] U.S. Cl. ....................................... 173/17; 173/73;
173/80
[58] Field of Search ................... 173/136, 135, 17, 73,
173/66, 80; 91/234

[56] References Cited

U.S. PATENT DOCUMENTS

| 2,887,989 | 5/1959 | Dulaney | 173/17 X |
|---|---|---|---|
| 3,598,187 | 8/1971 | Mothne | 173/73 |
| 3,826,316 | 7/1974 | Bassinger | 173/17 X |
| 4,084,646 | 4/1978 | Kurt | 173/17 |
| 4,312,412 | 1/1982 | Pillow | 173/17 |
| 4,333,537 | 6/1982 | Harris et al. | 173/17 |

Primary Examiner—Frank T. Yost
Assistant Examiner—Willmon Fridie, Jr.

[57] ABSTRACT

An improved fluid actuated rock drill hammer as shown having a cylinder housing, a reciprocal piston, and a centralized air distributing control tube axially extending through a central bore in the piston for controlling the operation of the piston. The control tube is mounted for assured concentricity of the tube within the piston bore and comprises a unitary mounting portion and tubular portion. The mounting portion includes a piloting section for concentric fit within the cylinder as received on a shoulder therein and the tubular portion extends concentric and perpendicular to the piloted section.

4 Claims, 1 Drawing Sheet

FLUID ACTUATED ROCK DRILL HAMMER

BACKGROUND OF THE INVENTION

1. Field of the Invention

This invention relates to a fluid actuated rock drill percussion tool or hammer, and more particularly to such a tool having a fluid distributing central control tube having outlet ports in association with fluid passages in the reciprocating piston to distribute the air through the tool.

2. Description of the Prior Art

All percussion hammers or drills generally comprise a cylindrical chamber having at its upper end means for delivering pressurized fluid to the chamber, and projecting from the opposite end, an axially movable earth boring drill bit. A reciprocating piston is disposed therebetween and, in response to fluid pressure, movable from an elevated position within the chamber to a striking position for delivering an impact blow to the bit to fracture rock thereby, and thence back to a raised position to repeat the impact. The pressurized fluid, which for the most part is air or air and a lubricating or dust inhibiting liquid, is finally exhausted from the hammer to flow back up the borehole, carrying with it the entrained crushed rock for cleaning or bailing the hole.

Distribution of the pressurized fluid within the cylinder to alternately pressurize the volume above the piston while exhausting the volume below the piston to cause the downward striking movement and subsequently, pressurizing the volume below the piston while exhausting the volume above it to raise the piston for another cycle without utilizing a flapper valve or the like, is generally accomplished by various structures such as:having, within the chamber, a central axially extending control tube, having porting corresponding to porting in a central axially extending bore in the reciprocating piston and in flow communication with opposite faces of the piston, such as shown for example in U.S. Pat. No. 4,312,412; having fluid passages in the wall of the cylinder with porting corresponding to reduced diameter portions of the piston for delivering pressurized fluid to opposite faces of the piston; or, a combination of fluid passages through the cylinder walls corresponding to reduced diameter portions of the piston and a central, shortened axially extending tube projecting into a central bore in the reciprocating piston, such as shown for example in U.S. Pat. No. 4,084,646.

The advantages of fluid distribution through a central control tube as opposed to through passages in the cylinder walls are:

(1) it permits a larger piston area for a given outer tool diameter in that the cylindrical wall thickness is not required for fluid passages, which results in a higher energy delivered by the piston impact;

(2) it permits the outer cylinder walls to have a longer wear life because the wall thickness is not interrupted by axially extending passages;

(3) due to the larger diameter piston, it permits a shorter piston length for the same weight, which in turn permits a shorter tool length;

(4) it permits relative ease of porting variation by merely changing the outlet ports in the control tube; and (5) the outer cylinder, being the wear item, is much less expensive to manufacture without air distributing ports or grooves machined therein.

However, fluid distribution through a central control tube has a major disadvantage which is the premature wear or breakage of the tube caused by misalignment of the relatively narrow-walled, axially extending tube which must be in relatively close sliding and sealing proximity to the walls of the central bore of the piston for minimizing leakage of the pressurized fluid from between these facing surfaces. Further, the axial length of the control tube amplifies any angular misalignment caused by the control tube mount.

Prior art arrangements for mounting the control tube, such as shown in the above-identified commonly owned U.S. Pat. No. 4,312,412, show a control tube received in and extending through a mounting collar; however, because of the necessary machining tolerances and their addition effect upon assembly of the multiple parts, it has been found impossible to maintain the control tube concentric with the piston bore and parallel therewith throughout its axial extent. One prior art solution has included seating the control tube on an O-ring that would accommodate misalignment of the depending tube by permitting the control tube, under the influence of the engaging surfaces of the piston bore and the tube, to force the tube into an appropriate position. This results in undue forceful engagement between the piston and the tube resulting in scuffing and early wear.

Heretofore, none of the control tubes having an axial extent which permits air distributing ports in cooperative alignment with air passages in the reciprocating piston, where the required axial length makes proper alignment more critical, have had a positive assembly alignment to maintain virtual concentricity of the control tube within the cylinder and the central bore of the piston.

SUMMARY OF THE INVENTION

Centralizing the control tube for virtual concentric alignment within the cylinder, or portion thereof comprising the piston chamber and the central bore of the piston, relies on a control tube having a mounting head defining a piloted cylindrical section concentric with the axis of the depending tube portion and with an O.D. coterminous or in press fit engagement with I.D. of the cylinder or piston chamber, and therefore concentric with the axis of the cylinder. A machined shoulder on the cylinder wall is in a lateral plane perpendicular to the axis of the cylinder, and the mounting head of the control tube, above the piloted section, has a mating shoulder perpendicular to the axis of the depending tube. The mounting head and the tube portion extending therefrom are a single unitary integral unit thereby eliminating previous misalignment due to assembly tolerances of previous multiple parts. The piloting section assures concentricity of the mounting head within the cylinder and the mating shoulders on the head and cylinder assure concentric alignment throughout the axial length of the depending tube, with the unitary structure eliminating assembly tolerances previously built into the control tube. Further, the unitary structure and piloted section eliminates any angular deviation between the center line of the tube and piston bore along the length of the axially extended tube. Also, the control tube, although having air distributing passages or ports, extends axially only approximately two thirds of the distance into the piston, thereby lessening any eccentricity or angular deviation at the terminal end.

DESCRIPTION OF THE PREFERRED EMBODIMENT

Figure 1:
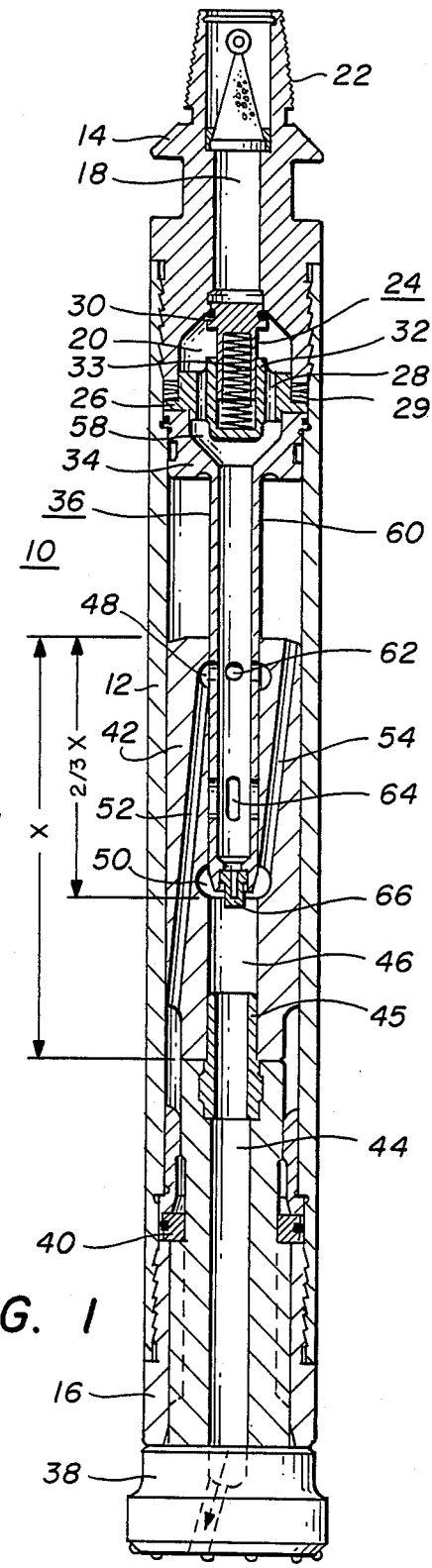
FIG. 1 is an axial cross-sectional elevational view of a hammer according to the present invention.

Referring to FIG. 1, the fluid actuated rock drill hammer 10 of the present invention is shown. The hammer 10 comprises a cylinder or wear sleeve 12, internally threaded at its opposite ends to securely engage an externally threaded top sub-assembly 14 and an externally threaded lower or drive sub-assembly 16.

Top sub 14 has an axially aligned bore 18 therethrough, terminating in a generally enlarged portion 20, and upper external threads 22 for connecting the top sub to a source of high pressure fluid such as pressurized air delivered through a drill string.

A check valve assembly 24 is mounted within the enlarged chamber 20 and defines a mounting flange 26 extending generally to the internal walls of the cylinder 12 and having fluid passages 28 extending therethrough. A check valve 30 is guided for axial movement in a sleeve 32 formed in the mounting flange 26 and is spring biased by a spring member 33 into engagement with the walls of the enlarged chamber 20, whereby, under the influence of the pressurized fluid, the valve 30 is retracted to the sleeve 32 to permit the flow of fluid therethrough, and thence through passages 28.

The mounting flange 26 rests on the transverse top face of a mounting head 34 of the control tube 36 to be described in more detail with respect to FIG. 2 hereinafter. A stack of disk springs 29 between the end face of the top sub 14 and the mounting flange 26 retain the mounting flange against axial movement.

With respect to the drive sub 16, a drill bit 38 is retained therein as with retaining ring 40 for axial movement under the influence of impact or hammer blows delivered to its upper surface by a reciprocating piston 42 housed within the cylinder 12. The bit 38 has an axial bore 44 passing therethrough, terminating in branch passages at the external face of the bit to deliver the pressurized fluid therethrough to clean or bail the borehole. A foot valve 45 is mounted within the bore 44 to extend above the upper end of the bit and project into an axial bore 46 at the bottom of the piston 42 to direct the pressurized fluid flow through the hammer 10.

The piston 42 is reciprocably mounted within the cylinder 12 to move from bit impact or lowermost position, as shown, to an elevated or upper position to repeat the blow under the influence of the pressurized fluid. As seen, the piston 42 throughout most of its axial extent, has an O.D. commensurate with the I.D. of the cylinder, and a generally constant diameter central bore 46 completely therethrough. The bore 46 is enlarged at two axially separate areas defining an upper annular chamber 48, and a lower annular chamber 50. It is important to note that both chambers 48 and 50 are in the upper two thirds of the axial extent of the bore 46 or piston 42.

Pressurized fluid passage 52 (only one being shown) extends from the piston bore upper chamber 48 to the lower face of the piston with a like fluid passage 54 extending from the piston bore lower chamber 50 to the upper face of the piston, so that when chamber 48 receives pressurized fluid, the piston 42 is raised and when chamber 50 receives pressurized fluid, the piston is driven downwardly to impact the bit 38.

A control tube 36 is disposed sub-adjacent the check valve assembly 24 and comprises a mounting head portion 34 disposed in the cylinder, in a manner more particularly described hereinafter with respect to FIG. 2, defining a chamber 58 in fluid communication with the fluid passages 28, and terminating in a concentric axially extending tube portion 60 having an O.D. in sliding engagement with the I.D. of the piston bore 46.

The tube portion 60 defines two axially separate groups of apertures with the axially uppermost group 62 being in axial alignment with piston bore chamber 48 when the piston is at its lowermost position (as shown in FIG. 1), and the axially lowermost group 64 is axial alignment with the piston bore chamber 50 when the piston is at its elevated position. In this manner, the piston acts as a valve to direct the high pressure fluid alternately to the top or bottom face of the piston, depending on the axial location of the piston, to reciprocate it between an elevated position and a bit-striking position. The terminal end of the tube 60 is closed by a removable choke member 66, which, depending upon the quantity of air available, can be removed or inserted to balance the usage of the pressurized fluid between hole cleaning and hammer operation.

The hammer 10 as described above, except for the placement of the piston bore chambers 48, 50 in the upper two thirds ($\frac{2}{3}$) portion of the piston, is, for the most part, similar to prior art hammers, such as shown for instance in previously identified U.S. Pat. No. 4,312,412, wherein a control tube having axially separated air discharge ports is utilized to distribute the air to opposite faces of a reciprocating piston.

Figure 2:
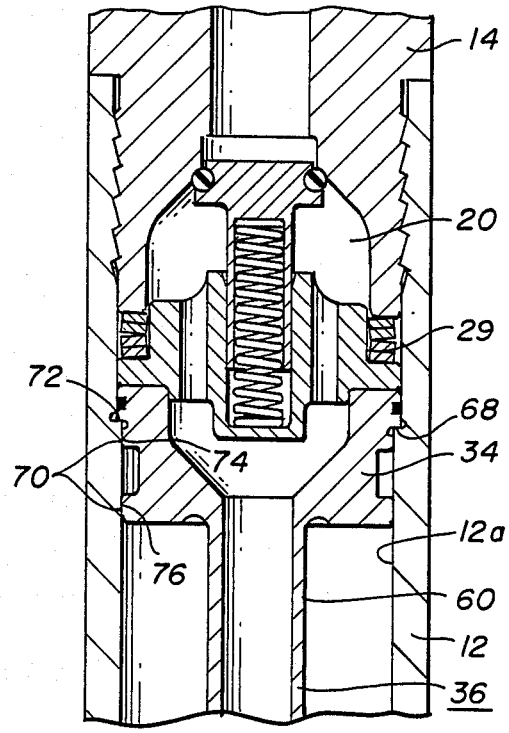
FIG. 2 is an enlarged portion of FIG. 1 showing the control tube mounting as assembled within the hammer.

Reference is now made to FIG. 2 to clearly show the mounting of the control tube 36 within the cylinder 12 to assure concentricity of the tubular portion 60 with respect to the cylinder 12 and the piston bore 46 so that scuffing of the tubular portion 60 (which is rather fragile with respect to the other hammer parts) by the reciprocating piston, is minimized.

First, in referring to FIG. 2, it must be pointed out that the tube portion 60 and the head portion 34 of the control tube 36 are unitary so that the placement and alignment of the tube portion 60 is entirely dependent upon the alignment of the head portion 34 within the cylinder 12, once concentricity of the O.D. of tube 60 with respect to the head 34 has been maintained during its fabrication.

Further, any angular misalignment of the tubular portion 60 is minimized by minimizing the length of such tubular portion 60 which in turn is permitted in the preferred hammer configuration because the piston bore chambers 48, 50 are in the upper two thirds ($\frac{2}{3}$) portion of the piston.

Thus, as shown in FIG. 2, the inner cylinder wall 12(a) is machined to a predetermined I.D. adjacent the head portion 34 of the control tube 36. A transverse shoulder 68 perpendicular to the axis of the cylinder wall 12(a) is machined into the cylinder wall 12a. The control tube mounting head portion 34 has a piloting cylindrical portion 70 defining axially specified piloting surfaces 74 and 76 machined concentric with the tube portion and defining close or press fit machined tolerances with respect to the cylinder wall 12a. The piloting surfaces, thereby, define axially separated contact to prevent cocking of angular misalignment of the tube within the cylinder. Such contact although shown as two separate circumferential areas 74, 76 could also be axially separated circumferential areas on a continuous cylindrical surface. It is preferred, in any case, that such piloting contact occur at an axial separation of a distance at least as great as one-fourth the O.D. of the piloting section.

Further, the head portion 34 has a transverse shoulder 72 perpendicular to the axis of the tube portion 60 for seating engagement on shoulder 68. Thus, with the tube portion 60 extending concentric and perpendicular from the piloting portion 70 of the control tube and mounted in the cylinder on shoulder 68 which is perpendicular to the cylinder axis, and in circumferential contact at piloting surfaces 74 and 76 with the I.D. of the cylinder 12(a), the control tube 36 must be concentric throughout its axial length with the cylinder wall 12(a) and thus the piston bore 46. Such concentricity precludes scuffing and premature wear as the piston 42 reciprocates in the cylinder and in generally sealing association with the control tube 36 to efficiently (i.e. with minimal leakage) distribute the pressurized fluid therein.

I claim:

1. An improved fluid actuated rock drill hammer comprising a cylinder defining an axially extending cylindrical inner wall and housing a reciprocal piston therein having a cylindrical surface in sliding engagement with said inner wall, means for directing pressurized fluid into said cylinder at one end, and a bit mounted to and extending from the cylinder at the opposite end with a portion thereof within the cylinder for impact by said piston, said piston having an axially extending central bore concentric with said inner wall and a first air passage means for fluid communication between one face of said piston and said bore and a second air passage means for fluid communication between the opposite face of said piston and said bore, and a control tube mounted within said cylinder having an enlarged head portion at one end having an inlet passage for receiving said pressurized fluid and with a tube portion axially extending from one side of said head portion and defining fluid distributing apertures therein and disposed in sliding sealing engagement with said piston bore, with said apertures aligned to distribute said pressurized fluid to said passages in said piston in accordance with alternately directing pressurized fluid to opposite faces thereof as said piston reciprocates, wherein said improvement comprises:

said control tube head portion and tube portion comprising a unitary structure and said head portion defining an axially extending piloting section directly engaging the cylindrical inner wall of said cylinder;

said cylindrical inner wall further having a shoulder in a plane perpendicular to the axis of said inner cylindrical wall and said head portion of said control tube defining a like transverse shoulder perpendicular to said piloting section for seating engagement with said cylinder shoulder; and said tube portion extending axially from said head portion and perpendicular to said shoulder on said head portion and concentric with said piloting section whereby said tube portion positively extends axially parallel with and concentric to the cylinder wall and thereby the bore of said piston throughout its length.

2. Structure according to claim 1 wherein said engagement of said head portion with the cylindrical inner wall is a press fit.

3. Structure according to claim 2 wherein said first and second air passage means communicate with said central bore of said piston in the upper two thirds axial length thereof.

4. Structure according to claim 3 wherein said piloting section includes axially separated piloting surfaces separated by a distance at least one-fourth of the O.D. of said surfaces.

* * * * *